US012284265B2

(12) United States Patent
Soceanu et al.

(10) Patent No.: US 12,284,265 B2
(45) Date of Patent: Apr. 22, 2025

(54) OPTIMAL PROFILE SELECTION FOR FHE BASED ANALYTICAL MODELS

(71) Applicant: International Business Machines Corporation, Armonk, NY (US)

(72) Inventors: Omri Soceanu, Haifa (IL); Gilad Ezov, Nesher (FI); Ehud Aharoni, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 17/809,036

(22) Filed: Jun. 27, 2022

(65) Prior Publication Data

US 2023/0421350 A1 Dec. 28, 2023

(51) Int. Cl.
*H04L 9/00* (2022.01)
*G06F 30/20* (2020.01)

(52) U.S. Cl.
CPC .............. *H04L 9/008* (2013.01); *G06F 30/20* (2020.01)

(58) Field of Classification Search
None
See application file for complete search history.

(56) References Cited

U.S. PATENT DOCUMENTS

| | | | | |
|---|---|---|---|---|
| 10,211,975 | B2 * | 2/2019 | Loftus | H04L 9/008 |
| 2003/0208284 | A1 * | 11/2003 | Stewart | G05B 17/02 700/30 |
| 2017/0134156 | A1 * | 5/2017 | Laine | H04L 9/008 |
| 2020/0076570 | A1 * | 3/2020 | Musuvathi | G06F 21/72 |
| 2021/0357692 | A1 * | 11/2021 | Traut | G06N 3/088 |
| 2023/0162062 | A1 * | 5/2023 | Kiciman | G06N 3/084 703/13 |

FOREIGN PATENT DOCUMENTS

| | | | |
|---|---|---|---|
| EP | 3933714 | A1 | 1/2022 |
| WO | 2021256841 | A1 | 12/2021 |

OTHER PUBLICATIONS

"A Tile Tensors Framework for Large Neural Networks on Encrypted Data", Network and Distributed Systems Security (NDSS) Symposium 2022, Feb. 27-Mar. 3, 2022, ISBN 1-891562-66-5, 18 pages.
Benaissa et al., "Tenseal: a Library for Encrypted Tensor Operations Using Homomorphic Encryption", ICLR 2021—Workshop on Distributed and Private Machine Learning (DPML), 12 pages.
Boemer et al., "nGraph-HE2: A High-Throughput Framework for Neural Network Inference on Encrypted Data", 7th Workshop on Encrypted Computing & Applied Homomorphic Cryptography (WAHC 2019), 29 pages.

* cited by examiner

*Primary Examiner* — Joseph P Hirl
*Assistant Examiner* — Hassan Saadoun
(74) *Attorney, Agent, or Firm* — Scott Dobson

(57) ABSTRACT

A method and system for evaluating and selecting an optimal packing solution (or solutions) for data that is run through a fully homomorphic encryption (FHE) simulation. In some instances, a user selected model architecture is provided in order to start simulating multiple potential configurations. Additionally, the cost of each simulated configuration is taken into account when determining an optimal packing solution.

18 Claims, 3 Drawing Sheets

250

OPTIMAL PROFILE SELECTION FOR FHE BASED ANALYTICAL MODELS

BACKGROUND

The present invention relates generally to the field of homomorphic encryption, and more specifically to utilizing analytical models to perform functions using homomorphic encryption.

The Wikipedia entry for "Homomorphic encryption" (as of Apr. 11, 2022) states as follows: "Homomorphic encryption is a form of encryption that permits users to perform computations on its encrypted data without first decrypting it. These resulting computations are left in an encrypted form which, when decrypted, result in an identical output to that produced had the operations been performed on the unencrypted data. Homomorphic encryption can be used for privacy-preserving outsourced storage and computation. This allows data to be encrypted and out-sourced to commercial cloud environments for processing, all while encrypted. For sensitive data, such as health care information, homomorphic encryption can be used to enable new services by removing privacy barriers inhibiting data sharing or increase security to existing services. For example, predictive analytics in health care can be hard to apply via a third party service provider due to medical data privacy concerns, but if the predictive analytics service provider can operate on encrypted data instead, these privacy concerns are diminished. Moreover, even if the service provider's system is compromised, the data would remain secure."

SUMMARY

According to an aspect of the present invention, there is a method, computer program product and/or system that performs the following operations (not necessarily in the following order): (i) receiving a user requirements data set, with the user requirements data set including information indicative of a model architecture in which to generate a plurality of configurations; (ii) generating, by a configuration generator module, the plurality of configurations for determining an optimal profile, with the plurality of configurations including information indicative of packing details and fully homomorphic encryption (FHE) configuration details; (iii) simulating, by a configuration simulator module, each configuration of the plurality of configurations in order to produce a set of simulation output data; (iv) evaluating, by a cost evaluation module, the plurality of simulated configurations in order to determine costs associated with each configuration for a given user; and (v) responsive to the evaluation of the plurality of simulated configurations, determining an optimal configuration that yields the lowest cost to the given user.

DETAILED DESCRIPTION

Figure 1:
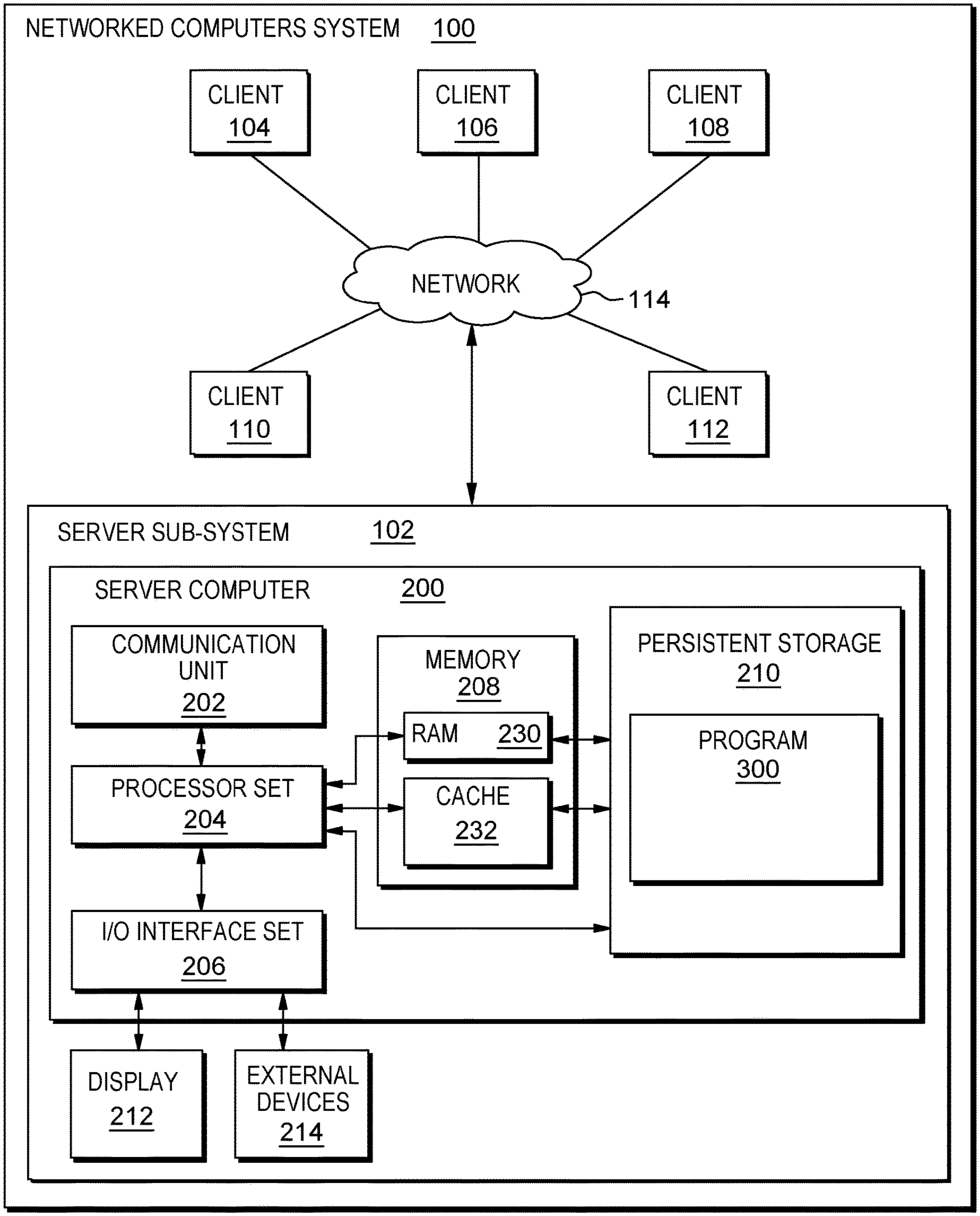
FIG. 1 is a block diagram view of a first embodiment of a system according to the present invention.

Some embodiments of the present invention are directed towards evaluating and selecting an optimal packing solution (or solutions) for data that is run through a fully homomorphic encryption (FHE) simulation. In some instances, a user selected model architecture is provided in order to start simulating multiple potential configurations. Additionally, the cost of each simulated configuration is taken into account when determining an optimal packing solution.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
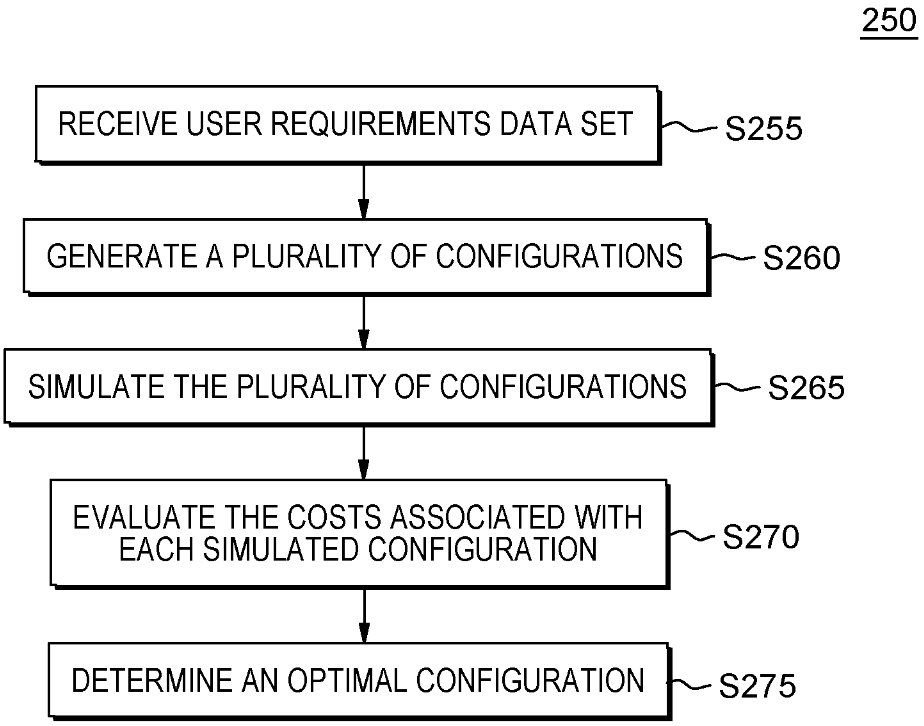
FIG. 2 is a flowchart showing a first embodiment method performed, at least in part, by the first embodiment system.
Figure 3:
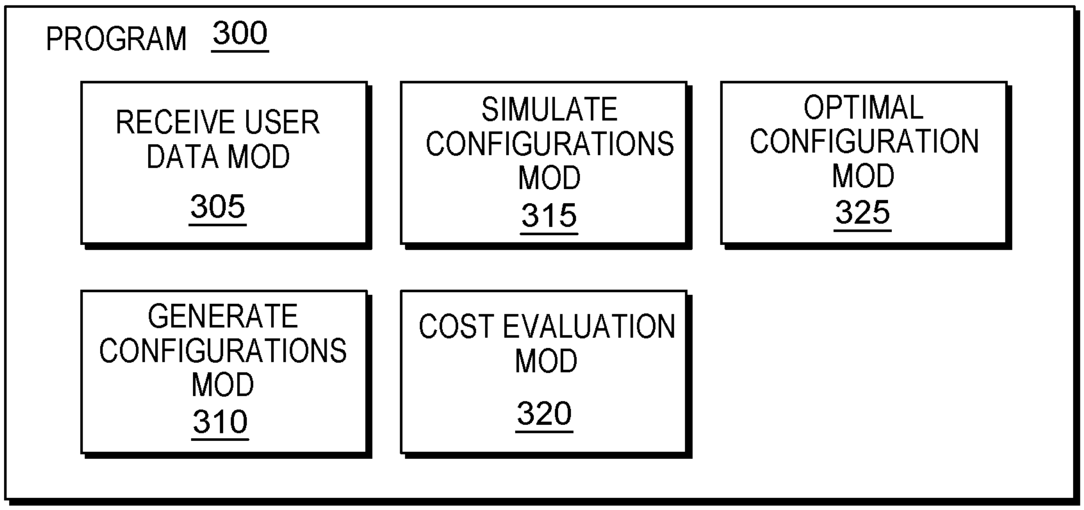
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive user requirements module ("mod") 305 receives a user requirements data set. In some embodiments of the present invention, the user requirements data set includes information indicating a particular model architecture that can be used to generate a plurality of configurations. In some embodiments, this model architecture includes a neural network (NN). Additionally, in some embodiments, the user requirements data set includes, but is not necessarily limited to the following: a desired security level, precision for calculation, a minimum and maximum batch size to work with, limitations with respect to CPU times and/or limitations with respect to maximum memory usage.

Processing proceeds to operation S260, where generate configurations mod 310 generates a plurality of configurations based upon the requirements provided by the user requirements data set (discussed in connection with operation S255, above). In some embodiments of the present invention, these generated configurations are used to ultimately determine an optimal profile for a user. In some embodiments, generate configurations mod 310 generates a full list of packing details for the plurality of configurations (discussed in greater detail in connection with configuration generator 402 of FIG. 4 in Sub-Section III, below)

Processing proceeds to operation S265, where simulate configurations mod 315 simulates each configuration that is generated by mod 310 (discussed in connection with operation S260, above). Simulate configurations mod 315 utilizes fully homomorphic encryption (FHE) to simulate and analyze each given configuration. After the simulation process has been completed, simulate configurations mod 315 generates a set of simulation output data. In some embodiments, the set of simulation output data includes at least the following: (i) the computation time of the different stages including encrypting the model and input samples; (ii) running inference and decrypting the results; (iii) the throughput; and/or (iv) the memory usage of the encrypted model.

Processing proceeds to operation S270, where cost evaluation mod 320 evaluates the cost associated with each simulated configuration. In some embodiments, cost evaluation mod 320 begins with the set of simulation output data (discussed in connection with operation S265, above). In one embodiment, starting with the set of simulation output data, cost evaluation mod 320 analyzes the throughput and the memory usage impact on an encrypted model (such as an encrypted neural network) for a given configuration. In some embodiments, the simulation output data that is used by cost evaluation mod 320 includes an estimation of what the "real" computation performed under encryption would take. For example, this information can indicate that a given simulation might take less than one (1) second to perform, but that the computation that was simulated would take one (1) hour.

In some embodiments, this cost value score is represented by a numeric value that is normalized. Alternatively, this cost value score is represented by a rank of the simulated configurations (that is, the simulated configurations are listed in order of "highest cost" to "lowest cost" or are listed in order of "lowest cost" to "highest cost").

Processing finally proceeds to operation S275, where optimal configuration mod 325 determines an optimal configuration that yields the lowest cost to the user (that is, the lowest cost value score). In some embodiments of the present invention, the process of determining the optimal configuration is an iterative process. In instances where the generated configurations do not yield an acceptable cost value score (for any of the simulated configurations), operations S255 through S270 are iteratively repeated until a simulated configuration produces a cost value score that is acceptable to the user, and thereby produces an optimal configuration for selection.

III. Further Comments and/or Embodiments

Typically, fully homomorphic encryption (FHE) schemes allow computing functions to be processed on encrypted data. These FHE schemes use the primitive operations such as add and multiply and rotate elementwise on vectors of given sizes. Thus, all operations are typically done with the constraint that all the data is packed into such vectors with a fixed given size, and all operations are Single Instruction Multiple Data (SIMD) operations on those vectors. Performing all of these tasks efficiently can be challenging. Therefore, careful and methodical packing is key in order to optimize performance for certain tasks.

In some instances, the process is especially challenging when moving from simple analytics to complex machine learning (ML) models. This process involves many complex parameters that are needed to be set and a huge number of combinations of them that need to be made. The chosen set of parameters (referred to in some instances as a "profile") highly influences the nature of the computation and its performance. Because manually choosing the optimal profile is difficult for both the expert and non-expert user, embodiments of the present invention provide a solution ("optimizer") to automatically search for an optimal profile for a given ML model.

The parameters involved in the process include both the homomorphic encryption (HE) library parameters (such as the security level, the precision, the number of slots in a ciphertext, the multiplication depth) and parameters related to the method of packing the ciphertexts into tile-tensors (such as the batch size and the dimensions of tiles to be used throughout the process).

The architecture of the desired ML model is another important factor that can be considered a parameter. Some of these parameters should be decided by the user (such as a specified security level). Other parameters are strict but are not easy to deduce (such as the required multiplication depth of the calculation in the case of a deep neural network). Some parameters (such as the dimensions of the tiles) are flexible and have thousands of valid options, and tuning them manually in a way that produces optimal results is almost impossible for the user.

The chosen set of parameters (that is, the profile) influences all kinds of measures. These measures include at least the following: (i) the latency of various stages of the computation (encrypting the model, encrypting the input samples, running the predictions); (ii) the throughput (number of samples processed per second); and (iii) the amount of memory taken by elements (the encrypted model, encrypted input samples). Additionally, the very feasibility of the computation might also be affected. The above measures are important because the inference under FHE might take a considerable amount of time and memory to complete.

In previous instances, methods found in nGraph-HE2 and TenSEAL, which are frameworks to provide optimized solutions for low latency (Latency) or high throughput (TP) of FHE analytics lacks some the advantages that results from using certain embodiments of the present invention. It is important to note that the focus of nGraph-HE2 is on unencrypted models and is not typically used for optimizing encrypted models, but rather mainly plaintext models that are employed over encrypted inputs. This same assertion holds true for TenSEAL in that this method does not work on matrix multiplication for encrypted matrices. The optimizers used by nGraph-HE2 and TenSEAL are not able to optimize under different constraints such as model size, batch size, bandwidth, etc.

Embodiments of the present invention addresses the optimization challenge using the "optimizer" solution. The optimizer receives high-level requirements from the user, such as the desired machine learning (ML) model architecture, security level and precision, batch size to work with, the measure to optimize for (such as the CPU time of the prediction operation) and optional limitations the user has over some measures (such as maximal memory, CPU times, etc.). The optimizer then performs a search in the space of possible profiles to find a profile that is optimal with respect to the desired measure to optimize, fulfills the user requirements and limitations, and is feasible with respect to the fully homomorphic encryption (FHE) library.

Previous FHE optimization solutions required running a batch of encrypted samples over the encrypted ML/analytical model. This was essential to find out the values of time, throughput and memory taken by the computation and in order to deduce the multiplication depth.

Performing these operations are not feasible in many practical applications because it will likely take a great amount of time to evaluate a single option of a profile, let alone search in a space of thousands of options.

In order to solve this problem, embodiments of the present invention introduce the usage of cleartext tile-tensors. These cleartext tile-tensors are empty of the encrypted numbers themselves and keep track of the needed metadata (such as tile-tensor shape, chain index, etc.) only. In addition, the empty cleartext tile-tensors are configured to keep track of the central processing unit (CPU) time taken by each operation that is evoked and the amount of memory taken by each allocated FHE element.

In some embodiments of the present invention, this solution relies on a set of pre-calculated benchmark values that are derived from the target machine (that is, the machine where the encrypted computation is expected to occur later on). Alternatively, in some embodiments, this solution relies on a set of pre-calculated benchmark values that are derived from the CPU time and memory consumption of every operation and element while considering FHE-related parameters. In some embodiments, the FHE-related parameters include the number of slots and chain index of the involved ciphertexts.

In some embodiments of the present invention, this mechanism allows the optimizer to run simulations of the inference process in a way that speeds up the evaluation of each profile by order of magnitudes, while still allowing it to deduce the complete information of a profile required to evaluate its quality.

With the simulation mechanism described above, the optimizer can scan all the possible states in the space. After scanning all possible states in the space, the optimizer tool evaluates each possible state and provides the user with an optimal profile.

In complex ML models such as deep neural networks, even this process might take a long time. For use-cases where the exhaustive search is too costly, embodiments of the present invention provide another solution of performing a local search in the space of possible profiles to find a local optimum. Local search using simulations highly speeds up the search process and, if done carefully, can often result with a global optimum. The optimizer also includes methods of choosing where to start the local search and which neighbors to evaluate in order to quickly find a desired profile.

In some embodiments, the packing optimizer module finds the most efficient packing arrangement for a given computation as well as the optimal configuration of the underlying fully homomorphic encryption (FHE) library. This alleviates the need from the user(s) to handle these FHE related complexities. In some embodiments, the user(s) only need to supply the model architecture. This model architecture includes a neural network (NN) in a standard file format.

In some embodiments, the packing optimizer module automatically converts the model architecture (such as the NN) to an FHE computation with an optimal packing and an optimal FHE library configuration. Users can provide additional constraints (such as the required security level or maximal memory usage) and choose an optimization target (such as determining whether to optimize for CPU time, latency or throughput, or optimize for memory usage).

In some embodiments, the packing optimizer module (sometimes simply referred to as "the optimizer" or "optimizer") needs to choose among a set of different possible configurations of the FHE library as well as different packing techniques to support certain operators. The packing optimizer module also chooses the tile shape. For example, consider an FHE scheme configured to have 16,384 slots in each ciphertext. Since the convolution operator uses five-dimensional tiles, the number of possible tuples $t1, \ldots, t5$ such that $\Pi$ i ti=16,384 is $(\log 2(16,384)+5-15-1)=3,060$. The term configuration in this context is used to refer to a complete set of options that the optimizer can choose (such as FHE configuration parameters, tile shape, and other packing options).

Figure 4:
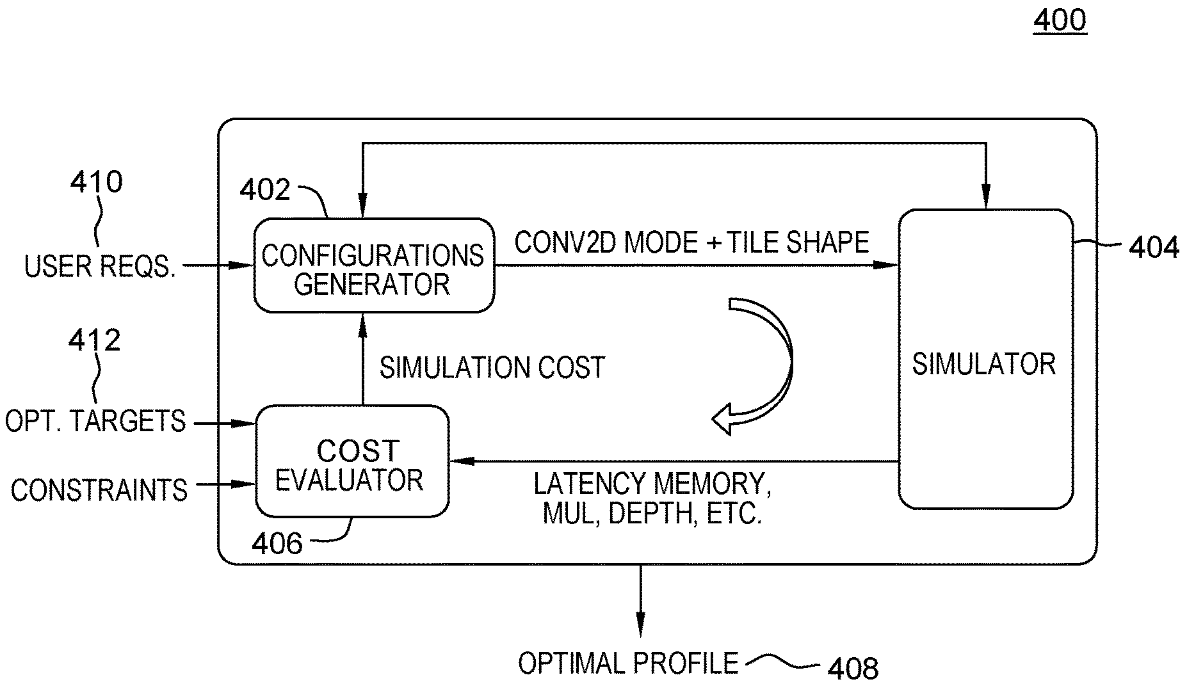
FIG. 4 is a block diagram showing a schematic representation of a first embodiment method according to the present invention.

Block diagram 400 of FIG. 4 shows a schematic representation of the packing optimizer module. Block diagram 400 includes configuration generator 402, simulator 404, cost evaluator 406, optimal profile 408, user requirements 410 and optimal targets and constraints 412.

In some embodiments, the user provides a JSON file that contains the model architecture. Configuration generator 402 generates a list of all possible configurations including the packing details and FHE configuration details applicable for this architecture. Simulator 404 tests every configuration (provided by configuration generator 402) and outputs data.

This output data includes at least the following: the computation time of the different stages including encrypting the model and input samples, running inference, and decrypting the results; the throughput; the memory usage of the encrypted model; input; and output; and more.

In some embodiments, the packing optimizer module passes this data to cost evaluator 406 for evaluation. Finally, cost evaluator 406 determines the configuration option that yields the optimal cost to the user (among the tested configurations) as well as simulation output profile.

In some embodiments, configuration generator 402 receives the model architecture and generates all applicable configurations for it. In some embodiments, configuration generator 402 generates different configurations with different algorithmic alternatives for implementing the computation (or parts of the computation). This includes providing different alternatives for implementing a convolutional layer.

From each of these three basic configurations, configuration generator 402 will create multiple complete configurations by exploring all possible tile shapes. In some embodiments, configuration generator 402 explores possible tile shape using one of two strategies.

The first strategy involves brute forcing over all valid options for tile shapes. Since these valid options may be numerous, a second strategy performs a search using a "steepest ascent hill climbing" local search algorithm. In some embodiments, the local search starts with a balanced tile shape, where the number of slots in every dimension is of the same order. Alternatively, the local search starts with a balanced tile shape, where the number of slots in every dimension is not necessarily in the same order because there exist tile shape configurations where this is not possible. However, in the instances where every dimension is not in the same order, the dimensions are as close to being in the same order as possible (as allowed by the tile shape configuration). This is a heuristic designed to avoid evaluating tile shapes that are likely to be computationally costly at the beginning of the search.

Then, all of the neighbor tile shapes of the current shapes are iteratively evaluated and continues to the best-improving neighbor as long as one exists. Some embodiments of the present invention consider two tile shapes as neighbors if one shape can be obtained from the other by multiplying or dividing the size of some of its dimensions by two.

We consider one shape as better than another shape based on the costs received from the cost evaluator. Using the local search algorithm highly speeds up the search process and we found empirically that it often results in a global optimum. This was the case in our AlexNet and CryptoNets benchmarks.

In some embodiments, simulator 404 receives as inputs the model architecture and a configuration option. At this stage, embodiments of the present invention evaluate the configuration by running it on encrypted input under FHE. In order to reduce computational costs, simulator 404 uses pre-calculated benchmark values such as the CPU time of every HE operation and the memory consumption of a tile (that is, the memory consumption of a single ciphertext). Then, simulator 404 evaluates the model on mockup tile tensor objects using these benchmarks. In some embodiments, these mockup tile tensors contain only meta data and gather performance statistics. In some embodiments, simulator 404 simulates an inference operation several orders of magnitude faster than when running the complete model on encrypted data.

In some embodiments, cost evaluator 406 evaluates output data from simulator 404 that considers the constraints and optimization targets provided by the user (such as optimal targets and constraints 412). After testing all possible configurations, the highest scoring configuration(s) is sent back as output to the user.

To demonstrate the advantage of using both the local search algorithm and the simulator, we performed experiments using AlexNet. Here, we fixed the number of slots to 16,384, the minimal feasible size for a NN that deep, and set the batch size to 1. The number of configuration options was 1360, with 680 different tile shapes for each convolution packing method. An exhaustive search that uses simulations took 5.1 minutes. In contrast, the local search algorithm took only 6.4 seconds and returned the same result. It did so after evaluating only 40 tile shapes. Running the local search method on actual encrypted data took 9.95 hours. Using the simulator time estimations, we predict that exhaustive search on encrypted data would take approximately 167 days (assuming unlimited memory). This demonstrates the importance of the mockup-based simulator.

The optimizer's simulator estimates the time and memory usage for a given configuration option on a single CPU thread. For that, it relies on pre-benchmarked measures. of the different FHE operations. To assess the accuracy of these estimations, we performed the following experiment on HE-friendly AlexNet using encrypted model. We chose the four configuration options that achieved the lowest estimated latency when using local search (Section V) and compared the inference time and the encryption time of the input and the model between the simulation output and an actual run over encrypted data. Table V summarizes the results. We observe that the simulator provides relatively accurate time estimations for all four configurations. The average estimated time deviation is −15.8%, −11.9%, and −7.2% for inference, model encryption, and batch input encryption, respectively. We note that the simulated storage matches the measured storage for all configurations.

Embodiments of the present invention include the following features, characteristics and/or advantages: (i) the configuration simulation module includes a memory tracking feature when evaluating the cost of a given configuration (that is, tracking the memory usage impact on an encrypted model); (ii) uses the pre-calculated benchmarks on the target machine where the encrypted computation would run (and not necessarily on the machine that currently runs the simulations); (iii) sets various limitations and/or constraints with respect to the time taken to perform a set of simulations and the memory utilized as part of the optimization process; and (iv) uses the optimizer search tool to perform an optimal packing method that takes into account the various configurations that can arise from utilizing multiple (customizable) tile tensor shapes.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Neighbor: in the space of tile shapes, two tile shapes S and S' of dimension N will be considered a neighbor of one another if the vectors representing the sizes of the shapes along each dimension, S=(t_1, t_2, . . . , t_N) and S'=(t_1', t_2', . . . , t_N'), are close according to some metric defined over N-dimensional vectors. An example for such a metric includes, but is not necessarily limited to the following: consider S and S' as neighbors if S' can be obtained from S by multiplying the value along one of the dimensions of S by 2, or by dividing the value along one of the dimensions of S by 2, or by doing both operations above.

What is claimed is:

1. A computer-implemented method (CIM) comprising:

receiving a user requirements data set, with the user requirements data set including information indicative of a model architecture in which to generate a plurality of configurations;

generating, by a configuration generator module, a first plurality of configurations for determining an optimal profile, with the first plurality of configurations including information indicative of a first set of packing details and a first set of fully homomorphic encryption (FHE) configuration details;

simulating, by a configuration simulator module, each configuration of the first plurality of configurations in order to produce a first set of simulation output data;

evaluating, by a cost evaluation module, the first plurality of simulated configurations in order to determine costs associated with each configuration for a given user; and responsive to the evaluation of the plurality of simulated configurations, determining an optimal configuration, with the optimal configuration being a configuration that yields the lowest cost to the given user.

2. The CIM of claim 1 further comprising:

determining that the first plurality of configurations that are generated does not yield an optimal configuration;

responsive to the determination, generating, by the configuration generator module, a second plurality of configurations for determining the optimal profile, with the second plurality of configurations including information indicative of a second set of packing details and a second set of fully homomorphic encryption (FHE) configuration details;

simulating, by the configuration simulator module, each configuration of the second plurality of configurations in order to determine costs associated with each configuration for the given user;

evaluating, by the cost evaluation module, the second plurality of simulated configurations in order to determine costs associated with each configuration for the given user; and responsive to the evaluation of the second plurality of simulated configurations, determining the optimal configuration.

3. The CIM of claim 1 wherein the cost evaluation module iteratively evaluates subsequent pluralities of simulated configurations until the optimal configuration is determined.

4. The CIM of claim 1 wherein the simulation of each configuration of the first plurality of configurations includes tracking memory usage impact on an encrypted model.

5. The CIM of claim 1 wherein:

the simulation configuration module sets a first limitation with respect to a time period in which a computation of encrypted data must be performed; and the simulation configuration module sets a second limitation with respect to an amount of memory that the computation of the encrypted data cannot exceed.

6. The CIM of claim 1 wherein the configuration simulator module uses a local search mechanism in order to efficiently allow for the determination of the optimal configuration.

7. A computer program product (CPP) comprising:

a machine readable storage device; and computer code stored on the machine readable storage device, with the computer code including instructions and data for causing a processor(s) set to perform operations including the following:

receiving a user requirements data set, with the user requirements data set including information indicative of a model architecture in which to generate a plurality of configurations, generating, by a configuration generator module, a first plurality of configurations for determining an optimal profile, with the first plurality of configurations including information indicative of a first set of packing details and a first set of fully homomorphic encryption (FHE) configuration details, simulating, by a configuration simulator module, each configuration of the first plurality of configurations in order to produce a first set of simulation output data, evaluating, by a cost evaluation module, the first plurality of simulated configurations in order to determine costs associated with each configuration for a given user, and responsive to the evaluation of the plurality of simulated configurations, determining an optimal configuration, with the optimal configuration being a configuration that yields the lowest cost to the given user.

8. The CPP of claim 7 further comprising:

determining that the first plurality of configurations that are generated does not yield an optimal configuration;

responsive to the determination, generating, by the configuration generator module, a second plurality of configurations for determining the optimal profile, with the second plurality of configurations including information indicative of a second set of packing details and a second set of fully homomorphic encryption (FHE) configuration details;

simulating, by the configuration simulator module, each configuration of the second plurality of configurations in order to determine costs associated with each configuration for the given user;

evaluating, by the cost evaluation module, the second plurality of simulated configurations in order to determine costs associated with each configuration for the given user; and responsive to the evaluation of the second plurality of simulated configurations, determining the optimal configuration.

9. The CPP of claim 7 wherein the cost evaluation module iteratively evaluates subsequent pluralities of simulated configurations until the optimal configuration is determined.

10. The CPP of claim 7 wherein the simulation of each configuration of the first plurality of configurations includes tracking memory usage impact on an encrypted model.

11. The CPP of claim 7 wherein:

the simulation configuration module sets a first limitation with respect to a time period in which a computation of encrypted data must be performed; and the simulation configuration module sets a second limitation with respect to an amount of memory that the computation of the encrypted data cannot exceed.

12. The CPP of claim 7 wherein the configuration simulator module uses a local search mechanism in order to efficiently allow for the determination of the optimal configuration.

13. A computer system (CS) comprising:
a processor(s) set;
a machine readable storage device; and
computer code stored on the machine readable storage device, with the computer code including instructions and data for causing the processor(s) set to perform operations including the following:
receiving a user requirements data set, with the user requirements data set including information indicative of a model architecture in which to generate a plurality of configurations,
generating, by a configuration generator module, a first plurality of configurations for determining an optimal profile, with the first plurality of configurations including information indicative of a first set of packing details and a first set of fully homomorphic encryption (FHE) configuration details,
simulating, by a configuration simulator module, each configuration of the first plurality of configurations in order to produce a first set of simulation output data,
evaluating, by a cost evaluation module, the first plurality of simulated configurations in order to determine costs associated with each configuration for a given user, and
responsive to the evaluation of the plurality of simulated configurations, determining an optimal configuration, with the optimal configuration being a configuration that yields the lowest cost to the given user.

14. The CS of claim 13 further comprising:
determining that the first plurality of configurations that are generated does not yield an optimal configuration;
responsive to the determination, generating, by the configuration generator module, a second plurality of configurations for determining the optimal profile, with the second plurality of configurations including information indicative of a second set of packing details and a second set of fully homomorphic encryption (FHE) configuration details;
simulating, by the configuration simulator module, each configuration of the second plurality of configurations in order to determine costs associated with each configuration for the given user;
evaluating, by the cost evaluation module, the second plurality of simulated configurations in order to determine costs associated with each configuration for the given user; and
responsive to the evaluation of the second plurality of simulated configurations, determining the optimal configuration.

15. The CS of claim 13 wherein the cost evaluation module iteratively evaluates subsequent pluralities of simulated configurations until the optimal configuration is determined.

16. The CS of claim 13 wherein the simulation of each configuration of the first plurality of configurations includes tracking memory usage impact on an encrypted model.

17. The CS of claim 13 wherein:
the simulation configuration module sets a first limitation with respect to a time period in which a computation of encrypted data must be performed; and
the simulation configuration module sets a second limitation with respect to an amount of memory that the computation of the encrypted data cannot exceed.

18. The CS of claim 13 wherein the configuration simulator module uses a local search mechanism in order to efficiently allow for the determination of the optimal configuration.

* * * * *